F. E. CASE.
DEVICE FOR GROUNDING TROLLEY CORDS.
APPLICATION FILED SEPT. 25, 1908.

1,011,741.

Patented Dec. 12, 1911.

WITNESSES:
W. Ray Taylor.
J. Ellis Eley

INVENTOR:
FRANK E. CASE
BY
ATTY.

COLUMBIA PLANOGRAPH CO., WASHINGTON, D. C.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

DEVICE FOR GROUNDING TROLLEY-CORDS.

1,011,741.     Specification of Letters Patent.     Patented Dec. 12, 1911.

Application filed September 25, 1908. Serial No. 454,759.

*To all whom it may concern:*

Be it known that I, FRANK E. CASE, a citizen of the United States, residing at Schenectady, county of Schenectady, State of New York, have invented certain new and useful Improvements in Devices for Grounding Trolley-Cords, of which the following is a specification.

This invention relates to electric railways, and its object is to protect the trainmen from danger of injurious shock from overhead conductors charged to high potentials.

At the present time a number of electric railways are equipped with overhead conductors carrying currents as high as 6600 volts, collected by a trolley wheel carried on the ordinary type of trolley pole, usually provided with a cord for enabling the car conductor or other trainman to pull down the pole when necessary. So long as the cord remains dry, it offers sufficient resistance to the electric current to make it safe for the trainman to handle it. But in wet weather, the moistened cord becomes more or less conductive, so that on high voltage lines there is danger of serious shock to the trainman when he grasps said cord. My invention aims to prevent all possibility of trouble of this kind by providing a permanent ground connection for the cord which will not interfere with its ordinary operation but will at all times afford a path to earth for any current which may leak down the cord. The point of connection of this ground conductor is always above that part of the cord grasped by the trainman, that is to say, between him and the trolley wheel.

In carrying out my invention I place a track upon the hood of the car and mount thereon a small traveler in which is an upright guide-opening through which the trolley cord passes with very little friction. The traveler shifts with the cord from one side of the car to the other in following the lateral movements of the trolley pole. The track being grounded there is no danger of shock to a man who takes hold of the cord at any point below it.

Figure 2:
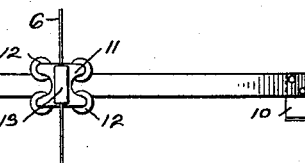
Figure 1:
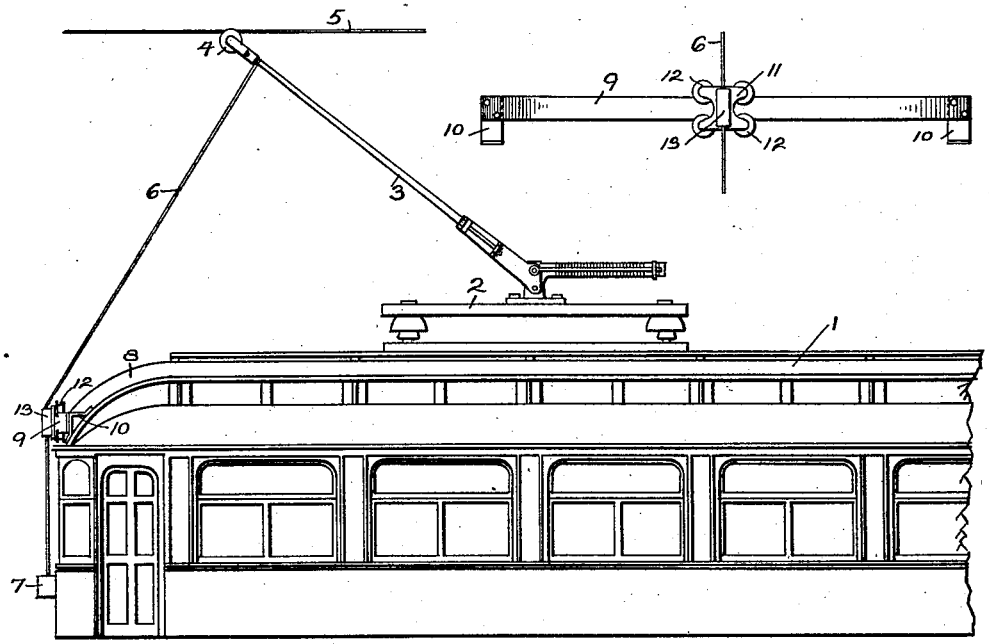
Figure 3:
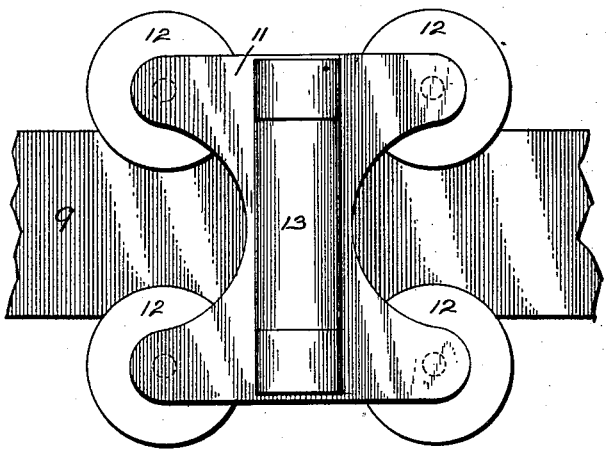
Figure 4:
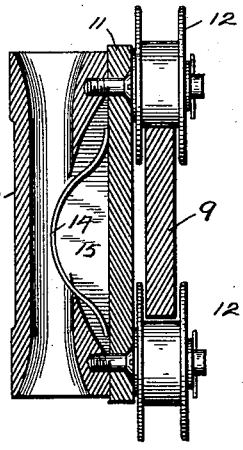

In the accompanying drawing, Figure 1 is a side elevation of a portion of an electric railway car equipped with my invention; Fig. 2 is a rear elevation of the track and traveler; Fig. 3 is a rear elevation of the traveler on a larger scale; and Fig. 4 is a vertical section thereof.

On the roof of the car 1 is mounted the insulated stand 2 which carries the trolley pole 3 having a traveling contact, such as the wheel 4, running along the overhead conductor 5. The cord 6 is attached to the upper end of the pole and hangs down over the end of the car, being preferably attached to a retriever 7. Across the end of the hood 8 of the car is a track 9, consisting preferably of a bar of metal, preferably curved to conform to the curvature of the hood, and supported at each end by brackets 10 fastened to the hood. The traveler has a body 11 to the back of which are pivotally attached grooved wheels 12, preferably four in number, and fitting the upper and lower edges of the track, so that said traveler can ride freely to and fro thereon. To the body 11 is secured a guide through which the cord 6 passes, said guide consisting preferably of an upright tube 13. Means are provided for making a good contact with the cord, consisting preferably of a flat arched spring 14 seated in a recess 15 at one side of the bore of the tube, into which the middle portion of said spring projects, so as to press against the cord. The track is grounded through the metal work and wheels of the car, so that any leakage current on the cord will be led off before it reaches the lower part of the cord, which is the portion grasped by the trainman when he wishes to pull down the trolley. This operation is independent of the length of the cord above the traveler, as the protection is constant whether the trolley be down or up, whether on the wire, or off the same with the cord in contact with the overhead structure.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. The combination with a trolley car and a trolley cord, of a guide having means for maintaining contact with said cord mounted on the car and permanently grounded.

2. The combination with a trolley car and trolley cord, of a permanently grounded guide for said cord laterally movable on the car.

3. The combination with a trolley car and a trolley cord, of a grounded track on said car, and a traveler on said track adapted to guide said cord.

4. The combination with a trolley car and a trolley cord, of a grounded track on said car, a traveler on said track, and a guide-tube on said traveler.

5. The combination with a trolley car and a trolley cord, of a grounded track on said car, a traveler on said track, a guide-tube on said traveler, and a contact device in said tube.

6. The combination with a trolley car and a trolley cord, of a grounded track on the hood of the car, a wheeled traveler on said track, a guide-tube on said traveler, and a spring in said tube.

In witness whereof, I have hereunto set my hand this 23rd day of September, 1908.

FRANK E. CASE.

Witnesses:
BENJAMIN B. HULL,
MARGARET E. WOOLLEY.

---

Copies of this patent may be obtained for five cents each, by addressing the "Commissioner of Patents, Washington, D. C."